United States Patent [19]

Leitgeb

[11] Patent Number: 4,722,742
[45] Date of Patent: Feb. 2, 1988

[54] PRESSURE SWING ADSORPTION

[75] Inventor: Paul Leitgeb, Pullach, Fed. Rep. of Germany

[73] Assignee: Linde Aktiengesellschaft, Wiesbaden, Fed. Rep. of Germany

[21] Appl. No.: 895,654

[22] Filed: Aug. 12, 1986

[30] Foreign Application Priority Data

Aug. 12, 1985 [DE] Fed. Rep. of Germany ....... 3528909

[51] Int. Cl.$^4$ .............................................. B01D 53/04
[52] U.S. Cl. ........................................... 55/26; 55/31; 55/62; 55/68; 55/75
[58] Field of Search ................... 55/25, 26, 31, 33, 35, 55/58, 62, 68, 74, 75

[56] References Cited

U.S. PATENT DOCUMENTS

| 3,155,468 | 11/1964 | de Montgareuil et al. | 55/25 |
| 3,306,841 | 2/1967 | Ward | 55/58 X |
| 3,365,859 | 1/1968 | Sandberg | 55/25 |
| 3,710,547 | 1/1973 | Nelson | 55/58 |
| 3,923,477 | 12/1975 | Armond et al. | 55/25 |
| 4,011,065 | 3/1977 | Münzner et al. | 55/25 |
| 4,144,038 | 3/1979 | Armond | 55/58 |
| 4,326,858 | 4/1982 | Benkmann | 55/26 |

FOREIGN PATENT DOCUMENTS

| 3132758 | 3/1983 | Fed. Rep. of Germany | 55/25 |
| 3338494 | 5/1985 | Fed. Rep. of Germany | 55/25 |
| 3346032A1 | 6/1985 | Fed. Rep. of Germany | . |
| 40412 | 4/1981 | Japan | 55/62 |
| 652956 | 3/1979 | U.S.S.R. | 55/62 |

*Primary Examiner*—Robert Spitzer
*Attorney, Agent, or Firm*—Millen & White

[57] ABSTRACT

In a pressure swing adsorption process during at least one stage of expansion, pressure buildup, or purging, a side stream of an expansion gas, pressure buildup gas or purge gas is withdrawn from or introduced into a central zone of the adsorber. The purge stream can be withdrawn in the loaded condition, if desired.

20 Claims, 5 Drawing Figures

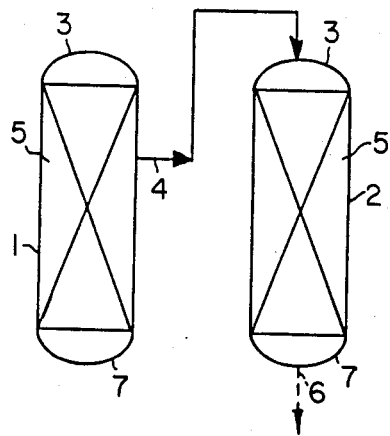
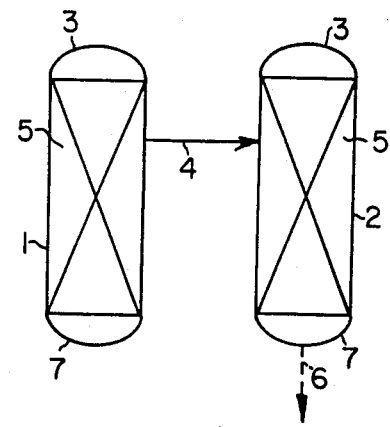
FIG. 1          FIG. 2
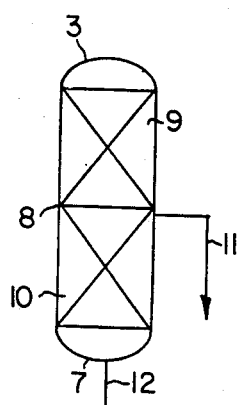
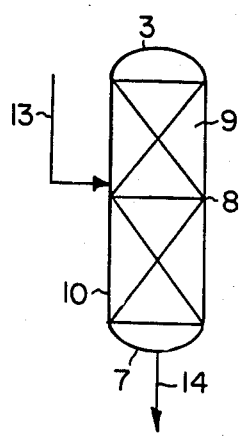
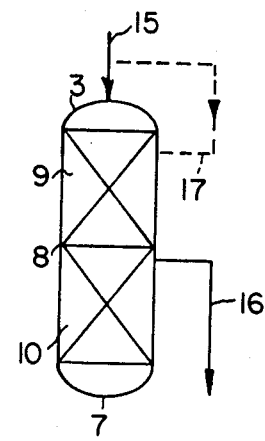
FIG. 3      FIG. 4      FIG. 5

PRESSURE SWING ADSORPTION

BACKGROUND OF THE INVENTION

The invention relates to the pressure swing adsorption process (PSA) for the separation of a gaseous mixture.

In general, in the PSA process, the first phase comprises selectively adsorbing components of the feed gas under pressure to obtain a gaseous stream depleted of the adsorbable components. Following the adsorption phase, the adsorber is subjected to multistage expansion to desorb the previously adsorbed components. Then the pressure is increased to the adsorption pressure and the cycle is repeated.

In such PSA separation processes, to facilitate and/or complete regeneration of the adsorbent, a purge gas is generally passed at the lowest process pressure through the adsorber to flush out desorbed proportions from the adsorber and to lower the partial pressure of the components to be desorbed.

In PSA processes, it is also conventional to interrupt the loading of an adsorber before the adsorption front has reached the outlet end of the adsorber. This yields the advantage that the subsequent expansion of the adsorber can be conducted in part cocurrently to the adsorption direction, the adsorption front progressing further to the outlet end, but with insignificant breakthrough, if any at all, of the adsorption front. Cocurrent expansion can be conducted in one or more stages. Before substantial amounts of adsorbable components exit from the outlet end of the adsorber, the expansion is then generally switched to countercurrent flow. The expansion gases obtained during cocurrent expansion are conventionally employed for the pressurization of other, previously regenerated adsorbers, or for purging adsorbers to be regenerated. One process of this type is known, for example, from DOS 3,346,032.

This type of operation, though well-proven and widely used under practical conditions, is not entirely satisfactory insofar as the adsorbent at the outlet end of an adsorber is not used to its full capacity, i.e., it is used merely to prevent breakthrough of adsorbable components during cocurrent expansion phases.

SUMMARY OF THE INVENTION

An object of one aspect of this invention is to provide an improved process of the type discussed above which permits greater utilization of adsorbent at the outlet end, while obtaining a gas containing unadsorbable components in a high product yield and/or in high product purity.

An object of another aspect of the invention is to provide apparatus for such a process.

Upon further study of the specification and appended claims, further objects and advantages of this invention will become apparent to those skilled in the art.

To attain these objects, the improvement comprises that, during at least one stage of expansion, pressure buildup, or purging, a side stream of an expansion gas, pressure buildup gas, purge gas is withdrawn from or introduced into a central zone of an adsorber. Purge gas withdrawn from the adsorber is generally in the loaded condition.

By central zone of an adsorber is meant anywhere between the inlet and outlet ends, preferably over 10–90% of the adsorber length.

In the process of this invention, during at least one phase of the switching cycle traversed by an adsorber, a flow path is employed wherein the gas, instead of being introduced or withdrawn from the outlet end or the inlet end of an adsorber, is introduced or withdrawn at an advantageous location between the adsorber ends. This results in a number of different advantages dependent on which process step or steps conform to the invention.

If, in a first embodiment of the process of this invention, expansion gas is withdrawn during a cocurrent expansion phase from the central zone of an adsorber, then this constitutes a flow reversal as compared with the usual cocurrent expansion for that part of the adsorber lying between the discharge point for the expansion gas and the adsorber outlet end. In other words, the region from the outlet end of the adsorber to the discharge point is expanded countercurrently rather than cocurrently so that the adsorption front does not advance further toward the outlet end of the adsorber and thus is loaded to a reduced extent with adsorbable components. This, in turn, benefits product purity in a subsequent adsorption phase and also reduces the regenerating required for complete desorption in this zone. In this first embodiment, it is advantageous to withdraw the expansion gas from the adsorber at a point corresponding approximately to between 60% and 90%, especially between 70% and 80% of the effective adsorber length, in the direction of flow during an adsorption phase.

In a more comprehensive embodiment of the above operation, it is advantageous, when using the cocurrent expansion gas for pressurizing another adsorber, to feed this gas to the adsorber to be pressurized likewise in a central zone, for example at a point corresponding to the point of withdrawal of the expansion gas from the adsorber to be expanded.

In another embodiment of the invention, expansion gas withdrawn from an adsorber during a countercurrent expansion phase is removed by way of a central tap. In a conventional countercurrent expansion with the expansion gas being withdrawn from the inlet end of the adsorber, components previously desorbed in the region of the adsorber inlet are partially readsorbed. This holds true, in particular, for adsorbers having different adsorbents for different gaseous components to be separated. In order to remove such components which become adsorbed near the inlet during countercurrent expansion, the conventional manner of operation necessitates an increased purge gas supply and/or a lower regenerating pressure which, in the final analysis, leads to lower product yields and/or higher energy requirements. By operating according to this invention, the expansion gas is withdrawn from a central zone of the adsorber during a countercurrent expansion phase; no readsorption can take place in the inlet end of the adsorber; and the subsequent regeneration by purging is facilitated. In this embodiment of the invention, it is advantageous when the adsorber contains a single adsorbent, to withdraw the countercurrent expansion gas at a point constituting about between 10% and 40%, especially between 20% and 30% of the adsorber length (starting from the inlet end in the direction of flow during adsorption). In the case of multiple layers of adsorbents, it is advantageous to effect such withdrawal close to the boundary zone of two layers (within a region of 0–30%, preferably 0 to 15% of the layer length).

Countercurrent expansion can take place optionally in two stages wherein, during a first countercurrent expansion stage, the expansion gas is withdrawn from the central zone of the adsorber as indicated above, and, in a subsequent, second countercurrent expansion phase, a conventional withdrawal via the adsorber inlet end is conducted.

In a further modification, the countercurrent expansion gas is withdrawn simultaneously via the central zone of the adsorber and via its inlet end. Preferably about 20 to 50% of the countercurrent expansion gas is withdrawn via the central zone with the remainder being withdrawn through the inlet end.

Finally, a central tap of the adsorber can be used for the introduction or removal of purge gas to or from a loaded adsorber. This manner of operation is especially advantageous if the adsorber is loaded with different components and/or contains at least two layers of adsorbents, wherein the different components and/or the two layers to be purged are at least partially separated from each other.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein:

FIG. 1 is a first embodiment of the invention wherein cocurrent expansion gas is withdrawn from a central zone of an adsorber;

FIG. 2 is a second embodiment of the invention wherein the cocurrent expansion gas is introduced into a central zone of another adsorber;

FIG. 3 is another embodiment of the invention wherein, during countercurrent expansion, expansion gas is withdrawn from a central zone of the adsorber;

FIG. 4 is a further embodiment of the invention wherein a purge gas is introduced into a central zone of the adsorber; and FIG. 5 is a further embodiment of the invention wherein purge gas loaded with desorbed components is withdrawn from a central zone of the adsorber.

For the purpose of clarity and simplicity, the above embodiments illustrated in the figures are segments of a larger integrated PSA process. It is also to be understood that the invention can be utilized in a large number of different PSA methods, for example in processes with at least two adsorbers up to a large number of adsorbers, for example, twelve or even more adsorbers. Moreover, the invention can be adapted to a preexisting psa facility.

DETAILED DESCRIPTION OF THE FIGURES

FIG. 1 shows two adsorbers 1 and 2, with adsorber 1 being in a cocurrent expansion phase. Cocurrent expansion can be conducted from the adsorption pressure to an intermediate pressure, or as well as from an intermediate pressure to a lower pressure.

In any cocurrent expansion steps that may have been carried out in a preceding stage, the expansion gas could also have been withdrawn from the adsorber outlet end 3 under certain circumstances. During the cocurrent expansion phase shown in FIG. 1, the expansion gas is withdrawn via a central tap 4 of the adsorber and introduced into the outlet end 3 of adsorber 2 which is either repressurized after regeneration has taken place, or, alternatively, is being purged at this time. In case of a purging step, the purge gas loaded with desorbed components exits via conduit 6 at the inlet end 7 of adsorber 2 (based on the flow direction during an adsorption phase). The central tap 4 is generally located in the top half and preferably 70% of the length of the adsorber, based on the flow direction during an adsorption phase.

In the embodiment of the invention shown in FIG. 2, the adsorber 1 passes through the same process step as in FIG. 1, but the cocurrent expansion gas withdrawn via conduit 4 is fed into adsorber 2 likewise in a central zone.

The adsorbent packing 5 is illustrated in FIGS. 1 and 2 as a uniform packing. However, if desired, it can also consist of several superimposed layers of different adsorbents, as illustrated in FIGS. 3–5.

FIG. 3 shows the countercurrent expansion phase of an adsorber 8 containing adsorbent layers 9 and 10. In this procedure, first cocurrent expansion gas is withdrawn via conduit 11 from the central zone of the adsorber, this zone lying substantially at the interface between the two adsorbent layers 9 and 10. After an intermediate pressure has been reached, further expansion gas is then withdrawn via conduit 12 from the inlet end 7 of the adsorber until the lowest process pressure is reached. Optionally, the countercurrent expansion gases can also be withdrawn simultaneously, or at least in part simultaneously, by way of conduits 11 and 12. Removal of at least a portion of the expansion gas via conduit 11 from the central zone of adsorber 8 has the effect, desirable in many instances, that the expansion gases that frequently contain different components, withdrawn from bed sections 9 and 10, respectively, are not conducted over the other bed section, and thus cannot at that location lead to undesirable readsorptions. Although this embodiment of the process is illustrated in FIG. 3 with two different adsorbent bed sections 9 and 10, this manner of operation offers advantages even with a unitary adsorption bed, as shown in FIGS. 1 and 2, especially if different components are adsorbed in such a bed, i.e., in such cases where a more adsorbable component is deposited in a zone proximate to the inlet end 7, and a less adsorbable component is deposited in a zone extending farther toward the outlet end 3 of the adsorber.

FIG. 4 shows another embodiment of the invention wherein purge gas is introduced via conduit 13 into a central zone of an adsorber 8 and withdrawn via a conduit 14 provided at the inlet end 7 of the adsorber. This flow of the purge gas corresponds essentially to that of the adsorber 2 illustrated in FIG. 2, but in FIG. 4, two adsorbent layers are provided. A special advantage of this purge gas flow is obtained when the adsorption bed 10 is to be freed of adsorbed components while the bed section 9 arranged in the closer proximity to the outlet end has already been adequately regenerated by the preceding expansion, or if, for the desorption thereof, a separate purging phase is provided, for example as illustrated in FIG. 5.

According to FIG. 5, purge gas is introduced into the adsorber 8 by way of the outlet end 3 by means of conduit 15; this purge gas, after flowing through bed section 9, is withdrawn from a central zone of the adsorber by way of conduit 16. Optionally, the purge gas can also be introduced into the upper region of bed section 9 via the conduit 17 illustrated in dashed lines.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a pressure swing adsorption process for the separation of a gaseous mixture comprising:
   (a) an adsorption phase operated under elevated pressure wherein adsorbable components in the gaseous mixture are selectively adsorbed on an adsorbent contained in an adsorber resulting in a gaseous stream depleted in the adsorbable components;
   (b) a multistage expansion phase to a lower pressure to remove gas within the adsorber and to desorb previously adsorbed components, optionally with the use of a purge gas, said multistage expansion phase comprising a countercurrent expansion stage; and
   (c) a pressure buildup phase to the elevated adsorption pressure, the improvement wherein, during countercurrent expansion an expansion gas is withdrawn simultaneously from a central zone and the inlet end of the adsorber.

2. A process according to claim 1, wherein withdrawn expansion gas is introduced into the central zone of an adsorber to be pressurized.

3. A process according to claim 1, wherein the withdrawn expansion gas is introduced into another adsorber to be pressurized.

4. A process according to claim 1, wherein during the purging of an adsorber, purge gas is introduced into the central zone of the adsorber, and purge gas loaded with desorbate is withdrawn from the inlet end of the adsorber.

5. A process according to claim 1, wherein during the purging of an adsorber, pruge gas is introduced into the adsorber via the outlet end, and purge gas loaded with desorbate is withdrawn from the central zone of the adsorber.

6. A process according to claim 1, wherein the central zone of the adsorber extends over the region of 10–90% of the adsorber length.

7. A process according to claim 1, wherein the adsorber contains at least two layer of different adsorbents.

8. A process according to claim 1, wherein the adsorber, after termination of an adsorption phase, contains at least two different sectors loaded with different components.

9. A process according to claim 1, wherein said adsorber contains a single adsorbent and said expansion gas withdrawn from the central zone by the adsorber is withdrawn from a region of about 10% to 40% of the adsorbent length starting from the inlet end of the adsorber.

10. A process according to claim 1, wherein about 20–50% of the countercurrent expansion gas is withdrawn from said control zone of the adsorber.

11. A process according to claim 1, wherein said adsorber contains a single adsorbent and said expansion gas withdrawn from the central zone is withdrawn from a region of about 20% to 30% of the adsorber length starting from the inlet end of said adsorber.

12. In a pressure swing adsorption process for the separation of a gaseous mixture comprising:
   (a) an adsorption phase operated under elevated pressure wherein adsorbable components in the gaseous mixture are selectively adsorbed on an adsorbent contained in an adsorber resulting in a gaseous stream depleted in the adsorbable components;
   (b) a multistage expansion phase to a lower pressure to remove gas within the adsorber and to desorb previously adsorbed components, optionally with the use of a purge gas; and
   (c) a pressure buildup phase to the elevated adsorption pressure, the improvement wherein, during the purging of an adsorber, purge gas is introduced into the adsorber via the outlet end, and purge gas loaded with desorbate is withdrawn from the central zone of the adsorber.

13. A process according to claim 12, wherein the central zone of the adsorber extends over the region of 10–90% of the adsorber length.

14. A process according to claim 12, wherein the adsorber contains at least two layers of different adsorbents.

15. A process according to claim 12, wherein the adsorber, after termination of an adsorption phase, contains at least two different sectors loaded with different components.

16. A process according to claim 12, wherein expansion gas withdrawn during the expansion phase is introduced into the central zone of an adsorber to be pressurized.

17. A process according to claim 12, wherein expansion gas withdrawn during the expansion phase is introduced into another adsorber to be pressurized.

18. A process according to claim 12, wherein expansion gas is withdrawn from a central zone of the adsorber during a cocurrent expansion phase.

19. A process according to claim 12, wherein expansion gas withdrawn from an adsorber during a countercurrent expansion phase is withdrawn from the central zone of the adsorber.

20. A process according to claim 19, wherein during the countercurrent expansion, expansion gas is simultaneously withdrawn from the inlet end and from the central zone of the adsorber.

* * * * *